United States Patent
Kang et al.

(10) Patent No.: US 10,186,353 B2
(45) Date of Patent: Jan. 22, 2019

(54) CORONA-RESISTANT RESIN-COMPATIBLE LAMINATES

(71) Applicant: E I DU PONT DE NEMOURS AND COMPANY, Wilmington, DE (US)

(72) Inventors: Byoung Sam Kang, Midlothian, VA (US); Sang Woo Lee, Seoul (KR)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 298 days.

(21) Appl. No.: 15/188,500

(22) Filed: Jun. 21, 2016

(65) Prior Publication Data

US 2017/0004908 A1  Jan. 5, 2017

Related U.S. Application Data

(60) Provisional application No. 62/186,546, filed on Jun. 30, 2015.

(51) Int. Cl.

| H01B 17/60 | (2006.01) |
|---|---|
| B32B 5/02 | (2006.01) |
| B32B 19/02 | (2006.01) |
| B32B 19/06 | (2006.01) |
| H01B 17/66 | (2006.01) |
| B32B 5/12 | (2006.01) |
| B32B 5/16 | (2006.01) |
| B32B 5/22 | (2006.01) |
| B32B 5/24 | (2006.01) |
| B32B 5/30 | (2006.01) |
| B32B 7/12 | (2006.01) |
| H01B 3/04 | (2006.01) |
| H02K 3/30 | (2006.01) |

(52) U.S. Cl.
CPC ............ *H01B 17/60* (2013.01); *B32B 5/024* (2013.01); *B32B 5/12* (2013.01); *B32B 5/16* (2013.01); *B32B 5/22* (2013.01); *B32B 5/24* (2013.01); *B32B 5/30* (2013.01); *B32B 7/12* (2013.01); *B32B 19/02* (2013.01); *B32B 19/06* (2013.01); *H01B 3/04* (2013.01); *H01B 17/66* (2013.01); *B32B 2260/046* (2013.01); *B32B 2262/0215* (2013.01); *B32B 2262/0269* (2013.01); *B32B 2262/101* (2013.01); *B32B 2307/206* (2013.01); *B32B 2457/04* (2013.01); *H02K 3/30* (2013.01)

(58) Field of Classification Search
CPC .......... H01B 17/60; H01B 17/66; H01B 3/04; B32B 5/12; B32B 5/024; B32B 7/12; B32B 19/02; B32B 19/06; B32B 2307/206; B32B 2260/046; B32B 2262/0215; B32B 2262/101; B32B 2307/718
See application file for complete search history.

(56) References Cited

U.S. PATENT DOCUMENTS

| 3,063,966 | A | 11/1962 | Kwolek et al. |
|---|---|---|---|
| 3,227,793 | A | 1/1966 | Cipriani |
| 3,287,324 | A | 11/1966 | Sweeny |
| 3,414,645 | A | 12/1968 | Morgan, Jr. |
| 3,756,908 | A | 9/1973 | Gross |
| 3,767,756 | A | 10/1973 | Blades |
| 3,869,429 | A | 3/1975 | Blades |
| 3,869,430 | A | 3/1975 | Blades |
| 4,259,398 | A | 3/1981 | Seino et al. |
| 4,273,825 | A | 6/1981 | Nishiyama et al. |
| 4,418,241 | A | 11/1983 | Fujiwara |
| 5,079,077 | A | 1/1992 | Sakayanagi et al. |
| 5,667,743 | A | 9/1997 | Tai et al. |
| 6,017,627 | A * | 1/2000 | Iwata ................ H01B 3/04 174/102 C |
| 6,103,382 | A | 8/2000 | Smith et al. |
| 6,312,561 | B1 * | 11/2001 | Forsten ............. C04B 30/02 162/145 |
| 6,524,710 | B1 | 2/2003 | Gsellmann |
| 6,991,845 | B2 | 1/2006 | Levit et al. |

(Continued)

FOREIGN PATENT DOCUMENTS

| CN | 102328478 A | 1/2012 |
|---|---|---|
| DE | 19640964 A1 | 4/1998 |
| EP | 0810249 A2 | 12/1997 |

(Continued)

OTHER PUBLICATIONS

English translation to DE 196 40 964 A1 to Piur (Apr. 16, 1998) obtained from European Patent Office website. (Year: 1998).*

(Continued)

*Primary Examiner* — Jeremy R Pierce

(57) ABSTRACT

Laminate structure suitable for use as electrical insulation comprising:

a) a corona-resistant layer comprising 90 to 99 weight percent uniformly distributed calcined mica and 1 to 10 weight percent aramid material, the aramid material being in the form of floc, fibrid, or mixtures thereof;

b) a support layer comprising unidirectional or woven filament yarns, the support layer having a first and second face; and c) a resin-compatible layer comprising 60 to 80 weight percent uniformly distributed uncalcined mica and 20 to 40 weight percent aramid material, the aramid material being in the form of floc, fibrid, or mixtures thereof;

wherein the first face of the support layer is directly bound to the corona-resistant layer and the second face of the support layer is directly bound to the resin-compatible layer; the laminate structure having a total mica content of 60 weight percent or greater.

13 Claims, No Drawings

(56) References Cited

U.S. PATENT DOCUMENTS 7,399,379 B2 7/2008 Levit et al.
2013/0196161 A1* 8/2013 Kang ..................... H01B 3/04
                                                              428/414

FOREIGN PATENT DOCUMENTS

EP          0996131  A1    4/2000
WO     2013/019715  A1    2/2013

OTHER PUBLICATIONS

International Search Report, dated Sep. 30, 2016, for International Application No. PCT/US2016/040070, filed Jun. 29, 2016.

* cited by examiner

CORONA-RESISTANT RESIN-COMPATIBLE LAMINATES

BACKGROUND OF THE INVENTION

Field of the Invention

The present invention relates to a laminate sheet structure suitable for use as electrical insulation in such things as motors and transformers.

Description of the Related Art

To those skilled in the art, the term "mica paper" refers to sheet made with high concentrations of the inorganic mineral mica, generally in an amount that is at least 90 weight percent or greater, with the remainder being a binder that provides some mechanical integrity to paper. However, the resulting mica paper is not a strong paper. U.S. Pat. Nos. 6,991,845 and 7,399,379 to Levit et al. discloses a sheet structure for electrical insulation or flame resistance comprising a barrier ply having a mica-rich face and a mica-poor face and a reinforcing ply containing a saturable backing layer attached to the mica-poor face of the barrier ply.

U.S. Pat. No. 6,991,845 to Levit et al. and U.S. Pat. No. 6,312,561 to Forsten et al. disclose an aramid-mica blended paper made from a homogenous blend of m-aramid fiber, m-aramid fibrids, and mica. Levit et al. further teaches that this "aramid-mica paper" has superior mechanical properties when compared to "mica paper" and can be used without any backing reinforcement.

In some incumbent sheet structures used in current high voltage market, high content mica paper is combined with a non-mica-containing layer of glass cloth or polyester film to compensate for mechanical weakness associated with a high mica content. However this non-mica-containing layer is believed to be responsible for most insulation failures due to its lower corona resistance, different thermal expansion, and different conductivity. Therefore electrical insulation that is capable of utilitzing more mica materials and less non-mica materials is desired.

SUMMARY OF THE INVENTION

This invention relates to a laminate structure suitable for use as electrical insulation comprising:

a) a corona-resistant layer comprising 90 to 99 weight percent uniformly distributed calcined mica and 1 to 10 weight percent aramid material, the aramid material being in the form of floc, fibrid, or mixtures thereof;

b) a support layer comprising unidirectional or woven filament yarns, the support layer having a first and second face; and c) a resin-compatible layer comprising 60 to 80 weight percent uniformly distributed uncalcined mica and 20 to 40 weight percent aramid material, the aramid material being in the form of floc, fibrid, or mixtures thereof;

wherein the first face of the support layer is directly bound to the corona-resistant layer and the second face of the support layer is directly bound to the resin-compatible layer; the laminate structure having a total mica content of 60 weight percent or greater.

DETAILED DESCRIPTION

This invention relates to a multilayer laminate structure comprising at least two layers containing mica and aramid materials, wherein the mica in the two layers is different. Mica particles, normally in the form of a flake of various types, such as muscovite or phlogopite or blends thereof, can be used; however, mica of the muscovite type is preferred.

One layer is a corona-resistant layer comprising calcined mica. "Calcined mica" as used herein means calcined muscovite or phlogopite mica that is obtained by heating natural mica to a high temperature (usually greater than 800° C., sometimes more than 950° C.). This treatment removes water and impurities and improves the temperature resistance of the mica. In particular, the calcined mica has improved dieletric properties and corona resistance. Calcination provides smaller-sized mica platelets when compared to natural or uncalcinated mica flakes. Unfortunately these smaller-sized mica platelets also form a less porous layer, meaning the layer can be difficult to wet out with impregnating matrix resins. This reduction in porosity can be seen by measuring the Gurley Porosity of the layer, which measures the time in seconds it takes to pass a certain volume of air through a certain area of material at a certain pressure differential. Higher values mean a less porous material.

The other mica layer is a resin-compatible layer comprising uncalcined mica. "Uncalcined mica" as used herein means uncalcined muscovite or phlogopite mica that is essentially in pure natural form that has preferably been homogenized and purified to remove imperfections and impurities. Uncalcined mica can form a very porous mica layer due to the larger size of the natural mica flakes. Its use in the layer results in a layer that is easily wetted and impregnated by a matrix resin. This is useful in vacuum pressurized impregnation of the electrical insulation with a matrix resin after the insulation is installed on electrical components. Further, the larger size of the mica flakes mean the layer has a higher tensile strength. Unfortunately, the uncancined mica has a lower dielectric breakdown strength than the calcined mica. However, this dielectric breakdown strength is still higher than non-mica materials sometime used; therefore the use of this stronger mica layer allows the use of less non-mica mechanical supporting material resulting in an improved electrical insulation.

Sandwiched between the resin-compatible layer and the corona-resistant layer and directly bound to both layers is a support layer comprising unidirectional or woven filament yarns. This layer provides mechanical integrity to the multilayer laminate.

Transformers and other electrical devices can contain a number of winding wires or conductors individually insulated to prevent one wire or conductor from coming in contact with another. In many cases these insulated winding wires or conductors are rectangular in cross section to ensure a dense uniform packing of the transformer windings. The words conductor and wire are used interchangeably herein.

In some embodiments the insulation is applied by spirally-wrapping narrow tapes of insulation around a conductor to form overlapping layers. In some instances this can allow routes for a transformer oil to penetrate and be present between the layers of the insulation. As used herein, "spirally wrapped" is meant to include spiral or helical wrapping of one or more tapes around the outer circumference of the conductor. As used herein the word "tape" means a relatively narrow-width strip of laminate, the tape having preferably a width of approximately 0.635 to 5.1 centimeters (0.25 to 2 inches). In some embodiments the width is from 0.635 to 2.54 centimeters (0.25 to 1 inches). In some embodiments the width is preferably 10 to 25 millimeters (1-2.5 cm or 0.39-1.0 inches). These laminate tapes are generally made by precise slitting of larger-width sheets or rolls of the laminate.

Since the overall thickness of the insulation on any one conductor can be made up of single wraps of tape or multiple overlapping tapes, in some embodiments the overall density of the sheath of electrical insulation on the conductor is from about 0.2 to 0.6 grams per cubic centimeter, preferably about 0.3 to 0.5 grams per cubic centimeter. In some embodiments the overall thickness of the insulation on any one conductor can be 0.635 to 1.3 centimeters (0.25 to 0.5 inches). An insulation thickness of less than about 0.0625 inches is believed to provide too little amount of insulation material to provide sufficient dielectric strength. A thickness of more than about 1.3 cm (0.5 inches) is believed to be impractical for many electrical devices. Since the overall thickness or "build" of the insulation can be an important parameter, the actual number of layers of tape that is overlapped can vary, with the insulation being 1 or 2 layers of laminate thick to as much as 10 to even 100 layers or more layers of laminate being possible.

Corona-Resistant Layer. The corona-resistant layer comprises 90 to 99 weight percent uniformly distributed calcined mica and 1 to 10 weight percent aramid material, based on the amount of calcined mica and aramid material in the layer. In some preferred embodiments, the corona-resistant layer comprises 95 to 99 percent uniformly distributed calcined mica and 1 to 5 weight percent aramid material. By uniformly distributed, it is meant the mica can be homogenously distributed throughout the corona-resistant layer, or the mica can be concentrated throughout a planar zone that is closer to one of the faces of the layer. Implicit in this definition is the mica is sufficiently distributed to provide the desired electrical performance of the layer in the laminate.

The aramid material is in the form of floc, fibrid, or mixtures thereof. In one embodiment, the aramid material in the corona-resistant layer comprises a mixture of 35-95 wt % binder and 5-65 wt % aramid floc, based on the amounts of binder and aramid floc in the layer. In some embodiments, the aramid material comprises 35-75 wt % binder and 25-65 wt % aramid floc, based on the amounts of binder and aramid floc in the layer. While the binder(s) can be any chemical or treatment or additive known in the art to bind floc or fibrous material to form a paper, in one preferred embodiment the binder is a binder particle, preferably a particle having a filmy structure. The preferred binder particle in the corona-resistant layer is a fibrid, and the preferred fibrid is an aramid fibrid. In another preferred embodiment, the aramid material in the corona-resistant layer consists only of aramid binder in the form of aramid fibrids. The preferred aramid material includes poly(meta-phenylene isophthalamide).

The corona-resistant layer preferably has a minimum basis weight of 50 grams per square meter. In some embodiments a basis weight of 100 grams per square meter is preferred. From a practical standpoint in some embodiments the layer has a maximum basis weight of 150 grams per square meter. In a preferred embodiment, the corona-resistant layer by itself has a Gurley Porosity of 500 seconds or lower.

Support Layer. The support layer comprises unidirectional or woven filament yarns and has a first face for binding the support layer directly to the resin-compatible layer and a second face for binding the support layer directly to the corona-resistant layer. In one preferred embodiment, the filament yarns of the support layer comprise glass yarns or yarns made from thermoplastic or thermoset polymers. In one most preferred embodiment, the filament yarns of the support layer comprise glass yarns.

Useful filaments include those that have a nominal diameter of about 30 micrometers, however useful filament diameters can range from 10 to 50 micrometers. Useful basis weights for the support layer include those that have a nominal diameter of about 22 grams per square meter, however useful basis weights can range from 10 to 30 grams per square meter.

It is believed the version of the support layer that is the most useful for many tape applications is a unidirectional warp of filament yarns. This allows the support layer to contribute a minimum amount of weight and/or thickness to the laminate. This is important in that the materials of the support layer generally do not have the dielectric performance of the corona or resin-compatible layers.

Resin-Compatible Layer. The resin-compatible layer comprises of 60 to 80 weight percent uniformly distributed uncalcined mica and 20 to 40 weight percent aramid material, based on the amount of uncalcined mica and aramid material in the layer. In some preferred embodiments, the resin-compatible layer comprises 65 to 75 percent uniformly distributed ucalcined mica and 25 to 35 weight percent aramid material. By uniformly distributed, it is meant the mica can be homogenously distributed throughout the resin-compatible layer, or the mica can be concentrated throughout a planar zone that is closer to one of the faces of the layer. Implicit in this definition is the mica is sufficiently distributed to provide the desired electrical performance of the layer in the laminate.

The inventors have found that the above-claimed composition provides a resin-compatible layer that has both the proper mechanical strength and wrapping attributes, along with enough porosity to absorb adequate amounts of a impregnating matrix resin. It is believed that having greater than 80 weight % of mica in the resin-compatible layer, based on the total amount of materials in that layer, will not provide not enough mechanical strength to the laminate to meet the minimum required tension for proper winding of a tape around a conductor, resulting in frequent breaks. In addition, having greater than 80 weight % of mica in the resin-compatible layer further results in a less flexible laminate. Tapes made from such a laminate have a tendency for more wrinkles, which are undesireable, when wound around a conductor As in the corona-resistant layer, the aramid material in the resin-compatible layer is in the form of floc, fibrid, or mixtures thereof. In one preferred embodiment, the aramid material in the resin-compatible layer comprises a mixture of 35-95 wt % binder and 15-65 wt % aramid floc, based on the amounts of binder and aramid floc in the layer. In some embodiments, the aramid material comprises 35-75 wt % binder and 25-65 wt % aramid floc, based on the amounts of binder and aramid floc in the layer. Similarly to the corona-resistant layer, while the binder(s) in the resin compatible layer can be any chemical or treatment or additive known in the art to bind floc or fibrous material to form a paper, in one preferred embodiment the binder is a binder particle, preferably a particle having a filmy structure. The preferred binder particle in the resin-compatible layer is a fibrid, and the preferred fibrid is an aramid fibrid. In another preferred embodiment, the aramid material in the resin-compatible layer comprises only aramid binder in the form of aramid fibrids. The preferred aramid material includes poly(meta-phenylene isophthalamide).

The resin-compatible layer prefereably has a minimum basis weight of 10 grams per square meter. In some embodiments a basis weight of 10 to 50 grams per square meter is preferred. In a preferred embodiment, the resin-compatible layer by itself has a Gurley Porosity of 800 seconds or lower.

Multilayer Laminate Structure. The multilayer laminate structure comprises the first face of the support layer directly bound to the resin-compatible layer and the second face of the support layer directly bound to the corona-resistant layer. In one embodiment the corona-resistant layer is bound to the support layer by use of an adhesive. In another embodiment, the resin-compatible layer is bound to the support layer by use of an adhesive. Useful adhesives include but are not limited to adhesives based on such things as polyurethanes, epoxies, polyimides, phenolics, melamines, alkyds, polyesters, polyesterimides, benzoxazines, silicones and combinations thereof.

In some preferred embodiments the support layer is attached and bound to both the corona-resistant layer and the resin-compatible layer by the adhesive action provided by the binder(s) that are already present in the corona-resistant and the resin-compatible layers. Lamination of the three layers with heat and pressure can force the binder(s) that are already present in the corona-resistant and the resin-compatible layers to flow and bind to the support layer. In fact, in one embodiment wherein the support layer is a unidirectional warp of filaments or an open mesh woven scrim, portions of the surfaces of the corona-resistant and the resin-compatible layers can touch, and via lamination the binder(s) present in the corona-resistant and the resin-compatible layers can attach those layers together at the contact points while also surrounding and binding the two layers to the filaments in the support layer.

The laminate structure has a total mica content of 60 weight percent or greater, based on the total weight of the laminate structure without any impregnating matrix resin. It is believed this total amount of mica is needed in the laminate to provide adequate electrical insulation performance. In some embodiments the total mica content of the total laminate structure is 80 weight percent or greater, based on the total weight of the laminate structure without any matrix resin. In some embodiments, the final overall composition of the multilayer laminate without matrix resin contains at least 15 weight percent aramid materials. In some embodiments the support layer makes up only 5 to 30 weight percent of the composition of the total laminate without matrix resin. In some other embodiments the support layer makes up 10 to 20 weight percent of the composition of the total laminate without matrix resin. Further, in some embodiments the adhesive is present from an amount of 0 to 8 weight percent of the composition of the total laminate without matrix resin and in some embodiments that is preferably 4 to 8 weight percent of that composition. In some other embodiments the amount of adhesive is 0 to 3 weight percent of the composition of the total laminate without matrix resin.

In some embodiments, the basis weight of the total multilayer laminate basis weight is about 70 g/m$^2$ to as much as 300 g/m$^2$; however in some preferred embodiments the basis weight is from about 100 g/m$^2$ to 225 g/m$^2$.

Other specific desired properties of the total multilayer laminate structure include a total thickness ranging from 0.10 to 1.0 mm. A preferred tensile strength of the laminate is 70 N/cm or greater, preferably 100 N/cm. For good matrix resin impregnation, it is believed that a measured Gurley porosity of the entire laminate of less than 3000 seconds is desirable, with a measured value of 200 seconds or greater being most preferred. Further, for useful wrapping of conductors with tapes of the multilayer laminate, the laminate should preferably have a flexibility or stiffness of less than about 150 N/m, preferably less than about 100 N/m for use in high-speed machine tape-wrapping processes. Finally, the total breakdown voltage for the laminate should preferably be more than 17.5 kV per millimeter of laminate thickness, preferably more than 20 kV per millimeter of laminate thickness.

The multilayer laminate structure can further comprise an impregnating resin, varnish, or mixture thereof, also referred to collectively herein as a matrix resin. In one preferred embodiment, the resin, varnish, or mixture thereof is partially or completely cured in the multilayer laminate structure. Generally the multilayer laminate structure or tape is first applied to the conductor and then the entire structure impregnated; however, there may be some instances where the laminate structure is pre-impregnated with a resin prior to use as insulation.

The term "floc", as used herein, means fibers that are cut to a short length and that are customarily used in the preparation of wet-laid sheets and/or papers Typically, floc has a length of from about 3 to about 20 millimeters. A preferred length is from about 3 to about 7 millimeters. Floc is normally produced by cutting continuous fibers into the required lengths using well-known methods in the art.

The term "aramid", as used herein, means aromatic polyamide, wherein at least 85% of the amide (—CONN—) linkages are attached directly to two aromatic rings. Optionally, additives can be used with the aramid and may be dispersed throughout the polymer structure. It has been found that up to as much as about 10 percent by weight of other polymeric material can be blended with the aramid. It has also been found that copolymers can be used having as much as about 10 percent of other diamines substituted for the diamine of the aramid or as much as about 10 percent of other diacid chlorides substituted for the diacid chloride of the aramid.

The preferred aramid is a meta-aramid. The aramid polymer is considered a meta-aramid when the two rings or radicals are meta oriented with respect to each other along the molecular chain. The preferred meta-aramid is poly (meta-phenylene isophthalamide)(MPD-I). U.S. Pat. Nos. 3,063,966; 3,227,793; 3,287,324; 3,414,645; and 5,667,743 are illustrative of useful methods for making aramid fibers that could be used to make aramid floc.

Alternatively, the aramid floc could be a para-aramid or an aramid copolymer. The aramid polymer is considered a para-aramid when the two rings or radicals are para oriented with respect to each other along the molecular chain. Methods for making para-aramid fibers are generally disclosed in, for example, U.S. Pat. Nos. 3,869,430; 3,869,429; and 3,767,756. One preferred para-aramid is poly(paraphenylene terephthalamide); and one preferred para-aramid copolymer is copoly(p-phenylene/3,4'diphenyl ester terephthalamide). The preferred aramid floc is a meta-aramid floc, and especially preferred is floc made from the meta-aramid poly(meta-phenylene isophthalamide)(MPD-I).

The term "fibrids", as used herein, means very small, nongranular, fibrous or film-like particles with at least one of their three dimensions being of minor magnitude relative to the largest dimension. These particles are prepared by precipitation of a solution of polymeric material using a non-solvent under high shear. Aramid fibrids are non-granular film-like particles of aromatic polyamide having a melting point or decomposition point above 320° C. The preferred aramid fibrid is a meta-aramid fibrid, and especially preferred are fibrids made from the meta-aramid poly(meta-phenylene isophthalamide) (MPD-I).

Fibrids generally have a largest dimension length in the range of about 0.1 mm to about 1 mm with a length-to-width aspect ratio of about 5:1 to about 10:1. The thickness dimension is on the order of a fraction of a micron, for example, about 0.1 microns to about 1.0 micron. While not required, it is preferred to incorporate aramid fibrids into the layers while the fibrids are in a never-dried state.

The term layer as used in the resin-compatible layer and the corona-resistant layer preferably refers to a thin planar material of a specific composition sometimes described as a "paper". The term "layer" also refers to a paper made from a plurality of thin planar webs attached together wherein all the planar webs have the same composition. As used herein, the term "face" refers to either of the two major surfaces of the layer or paper (i.e., one side or the other of the layer or paper).

In some embodiments, an individual layer has a thickness of 0.5 millimeters or less. In some other embodiments, an individual mica-aramid layer has a thickness of 0.25 millimeters or less. In one preferred embodiment an individual layer has a thickness of 0.13 millimeters or less; in other preferred embodiments an individual layer has a thickness of 0.1 millimeters or less. Further, it is believed that an individual layer should have a thickness of at least 0.06 millimeters to provide adequate mica to the laminate.

In one embodiment, the corona-resistant layer and the resin-compatible layer are bound to the support layer by use of a layer of adhesive. In one practice of this embodiment, each of the layers are made separately and then combined with a layer of adhesive provided in between, with the layers being, in order, the corona-resistant layer, the support layer, and then the resin-compatible layer. Each of the corona-resistant layer and the resin-compatible layer can be made separately on a paper-making machine by providing the desired amount and proportion of mica and/or aramid solids to the headbox and then wet-laying as a web onto a paper-making wire. The wet web can then be dried on dryer drums to form a paper. Preferably the paper is then further calendered in the nip of a hot roll calender under pressure and heat, or by other means, to consolidate and densify the paper into a layer having the desired thickness. If desired, two or more lighter basis weight or thinner wet webs or papers of the same composition can be made separately and then calendered and consolidated together into a single layer. In a preferred embodiment each of the corona-resistant layer and the resin-compatible layer are calendered separately prior to being combined with the support layer with adhesive.

In a preferred embodiment to homogeneous and continuously bind a face of the each of the corona-resistant layer and the resin-compatible layer to opposing faces of the support layer, the adhesive is applied to at least one face of a layer in a relatively uniform manner. The adhesive can be applied to either the mica-containing layer or the support layer using any method that provides a uniform continuous application of adhesive to one side of the layer without gaps; such methods include those that involve roll coating or blade coating or spray coating. Preferably the adhesive is applied to a uniform thickness, and preferably the adhesive is continuous and has a uniform thickness in the laminate. Alternatively, the adhesive can be provided in a sheet form inserted between each of the mica-containing layers and the support layer. The layers and adhesive are then pressed together, with the adhesive positioned in between the layers, using any method that can press or consolidate the layers together. Such methods could include nipping the layers (with adhesive between) in the nip(s) of a set of calender rolls. This consolidates the layers into a laminate structure having the desired thickness and fully binds the layers together. If needed, the adhesive can be additionally cured using heat applied before, after, or while the layers are pressed under pressure.

The laminate sheet structure comprises the corona-resistant layer, the support layer, and the resin-compatible layer, optionally with adhesive positioned in between the those layers. In a preferred embodiment, the final laminate structure consists essentially of, or only of, those three layers plus the optional adhesive. In some preferred embodiments, the laminate sheet is positioned on the conductor such that the resin-compatible layer is closer to and generally in contact with the conductor being insulated, with the corona-resistent layer forming the outer surface of the wound electrical insulation. However, in some other embodiments the laminate may be positioned on the conductor in the reverse order with the corona-resistant layer being in contact with the conductor and the resin-compatible layer forming the outer surface of the wound electrical insulation.

In some embodiments, the laminate sheet structure is slit into a tape that can in turn be impregnated with resin, using several possible methods. One common method comprises impregnating the laminate structure in the form of a tape with resin after it has been inserted into, or wound around, the item to be insulated. The resin is then cured. A second common method comprises impregnating the laminate structure in the form of a tape with resin prior to it being inserted into or wound around the item to be insulated, and then curing the resin.

While the laminate sheet structure is believed to have immediate use in industrial motors, wind turbine generators, other uses and applications are possible, including but not limited to such things as transformers and industrial power inverters.

Test Methods

The following test methods were used in the Examples provided below.

Basis Weight was measured according to ASTM D 645 and ASTM D 645-M-96 and reported in $g/m^2$.

Thickness was measured according to ASTM D 646-96 and reported in mm.

Tensile Strength was measured according to ASTM D 828-93 with 2.54 cm wide test specimens and a gage length of 18 cm and reported in N/cm.

Gurley Porosity was measured by air resistance in seconds per 100 mililiters of cylinder displacement for approximately 6.4 square centimeters circular area of a paper using a pressure differential of 1.22 kPa in accordance with TAPPI T460.

Stiffness (flexibility) was measured of the bending resistance of paper by measuring the maximum flexural load to bend a specimen divided by the length of test specimen (15 mm wide by 200 mm long) in accordance with IEC 60371-2 and reported in N/m.

Dielectric Strength was measured according to ASTM D 149-97A and reported in kV/mm.

EXAMPLES

Hereinafter the present invention will be described in more detail in the following examples.

Example 1

A multilayer laminate structure was made from three separate layers, which were a corona-resistant layer, a unidirectional glass thread support layer, and a resin-compatible layer. The corona-resistant layer was 0.15 mm thick and contained of 95 weight percent calcined mica flake (muscovite type available from the Electrical Samica Flake Co., Rutland, Vt.) and 5 weight percent poly(metaphenylene isophthalamide) fibrids made in a manner generally described in U.S. Pat. No. 3,756,908.

The resin-compatible layer was 0.03 mm thick and consisted of 70 weight percent uncalcined mica flake (muscovite type available from the SWECO Inc., South Korea) and 15 weight percent poly(metaphenylene isophthalamide) fibrids and 15 weight percent poly(metaphenylene isophthalamide) floc that was 0.22 tex linear density and 0.64 cm length Nomex® fiber, available from the DuPont Co., Wilmington, Del.

The glass yarn based support layer contained 50 μm glass thread. It was sandwiched with a layer of epoxy adhesive (approximately 9 g/m$^2$) between the corona-resistant layer and the resin-compatible layer and calendered between nipped calender rolls heated to 150° C. and operating at a nip pressure of 2500 N/cm to produce a laminate having corona-resistant layer, adhesive, a unidirectional glass thread support layer, adhesive, and a resin-compatible layer. The resulting laminate structure was well bonded and showed excellent tensile strength, flexibility and good Gurley porosity. Data for this laminate is shown in Tables 1 & 2.

Example 2

Example 1 was repeated, except a woven glass filament cloth replaced the unidirectional glass filaments as the supporting layer and the layer of epoxy adhesive was approximately 10 g/m$^2$. The glass cloth was 80 micrometers thick resulting in a total laminate structure thickness of 0.21 mm. Data for this laminate is shown in Tables 1 & 2.

Comparative Example A

Comparative Example A was mica tape that was made in a similar manner to Example 2 except it only contained only one thick uncalcined mica layer, epoxy adhesive (approximately 10 g/m$^2$), and one support layer that was woven glass filament cloth. The mica paper was made of 95 weight percent uncalcined mica flake (muscovite type available from the SWECO Inc., South Korea) and 5 weight percent poly(metaphenylene isophthalamide) fibrids having a thickness of 0.12 millimeters. The glass cloth was 80 micrometers thick. The resulting total laminate structure had a thickness of 0.161 mm and a basis weight of 194 gram per square meters. Data for this laminate is shown in Tables 1 & 2. Table 2 shows a significant increase in dielectric strength for Example 1 and 2 over the Comparative Example A. This improvement is a result of the calcined mica used in the mica-aramid paper of the present invention.

Comparative Examples B-C

Comparative Examples B-C were made in a similar manner to Example A except the two-ply mica-aramid papers replaced single-ply mica paper. The two-ply mica-aramid paper was made from a mica-rich ply and a mica poor ply. The mica-rich ply consisted of 90 weight percent calcined mica flake and 10 weight percent poly(metaphenylene isophthalamide) fibrids. The mica-poor ply consisted of 45 weight percent calcined mica flake, 40 weight percent poly(metaphenylene isophthalamide) fibrids and 15 weight percent poly(metaphenylene isophthalamide) floc. Aqueous dispersions of the mica-rich and mica-poor components were pumped through primary and secondary headboxes of a Fourdrinier-type papermaking machine. A layered wet-laid paper was formed with a mica-rich ply on the top and a mica-poor ply on the bottom. The basis weight of the top ply was about 85 g/m$^2$ and basis weight of the bottom ply was about 50 g/m$^2$. The layered wet-laid paper was calendered in a hot nip of a calender at a nip pressure of about 3000 N/cm and a roll temperature of about 220° C. with the adhesive and woven glass cloth to make the laminate Data for this laminate is shown in Tables 1 & 2. Table 2 also shows a significant increase in Gurley Porosity for Examples B and C. This increase in Gurely Porosity is a result of the extreme denisification of mica and aramid from hot temperature calendering calcined mica in the mica-aramid paper.

Example 3

Examples 1 and 2 are repeated, except the layers in the laminate were calendered without any additional adhesive, the binder in the mica layers binding those layers to the glass support layer. The performance and thickness of the final laminate is similar to that shown for Examples 1 and 2.

Example 4

The multilayer laminate structures of Examples 1, 2 and 3 are slit into rolls of 15 mm wide tape. The tape is then used to spirally wrap a metal conductor having a cross sectional dimension of 150 mm by 75 mm. The tape is wrapped in half wrap (50% overwrap) until the conductor is adequately insulated. Some of the wrapped conductors are used in a motor as is, while others are impregnated with an expoxy resin prior to use in the motor. The tapes provide good electrical insulation to the conductor.

TABLE 1

| | | Mica Layer(s) | | Support Layer | |
| | | | | Glass cloth or | |
| Example | Laminate Structure | Mica (wt %) | Aramid (wt %) | yarn (wt %) | Adhesive (wt %) |
| --- | --- | --- | --- | --- | --- |
| 1 | Calcined mica/glass yarn/uncalcined mica | 64.3 | 17.1 | 13.5 | 5.1 |
| 2 | Calcined mica/glass cloth/uncalcined mica | 66.3 | 16.7 | 12.3 | 4.7 |
| A | Uncalcined mica/glass cloth | 80.6 | 4.8 | 7.2 | 7.4 |
| B | Two-ply mica/glass cloth | 55.9 | 25.4 | 13.4 | 5.3 |
| C | Two-ply mica/glass yarn | 54.2 | 26.2 | 13.0 | 6.6 |

TABLE 2

| | Example | | | | |
| Properties | 1 | 2 | A | B | C |
| --- | --- | --- | --- | --- | --- |
| Thickness (mm) | 0.2 | 0.2 | 0.15 | 0.13 | 0.20 |
| Basis Weight (g/m$^2$) | 191 | 193 | 188 | 183 | 182 |

TABLE 2-continued

| Properties | Example | | | | |
|---|---|---|---|---|---|
| | 1 | 2 | A | B | C |
| Tensile Strength (N/cm) | 147 | 80 | 142 | 113 | 171 |
| Gurley Porosity (sec) | 2,200 | 2,400 | 286 | >35,000 | >35,000 |
| Stiffness (N/m) | 78 | 120 | 51 | 203 | 100 |
| Dielectric Strength (kV/mm) | 23.5 | 23.1 | 14.7 | 46.3 | 29.5 |

What is claimed is:

1. A laminate structure suitable for use as electrical insulation, comprising:
 a) a corona-resistant layer comprising 90 to 99 weight percent uniformly distributed calcined mica and 1 to 10 weight percent aramid material, the aramid material being in the form of floc, fibrid, or mixtures thereof, the corona-resistant layer having a basis weight of 100 to 150 grams per square meter;
 b) a support layer comprising unidirectional or woven filament yarns, the support layer having a first and second face; and
 c) a resin-compatible layer comprising 60 to 80 weight percent uniformly distributed uncalcined mica and 20 to 40 weight percent aramid material, the aramid material being in the form of floc, fibrid, or mixtures thereof, the resin-compatible layer having a basis weight of 10 to 50 grams per square meter;
wherein the first face of the support layer is directly bound to the corona-resistant layer and the second face of the support layer is directly bound to the resin-compatible layer; the laminate structure having a total mica content of 60 weight percent or greater.

2. The laminate structure of claim 1 wherein the resin-compatible layer is bound to the support layer by use of an adhesive.

3. The laminate structure of claim 1 wherein the corona-resistant layer is bound to the support layer by use of an adhesive.

4. The laminate structure of claim 1 wherein all the aramid material in the corona-resistant layer is present as an aramid fibrid.

5. The laminate structure of claim 1 wherein the aramid material in each of the corona-resistant and resin-compatible layers comprises a mixture of 35-95 wt % binder and 5-65 wt % aramid floc, based on the amounts of binder and aramid floc in each layer.

6. The laminate structure of claim 5 wherein the aramid material in each of the corona-resistant and resin-compatible layers comprises a mixture of 35-75 wt % binder and 25-65 wt % aramid floc, based on the amounts of binder and aramid floc in each layer.

7. The laminate structure of claim 5 wherein the binder is an aramid fibrid.

8. The laminate structure of claim 1 wherein the filament yarns of the support layer comprise glass yarns or yarns made from thermoplastic or thermoset polymers.

9. The laminate structure of claim 8 wherein the filament yarns of the support layer comprise glass yarns.

10. The laminate structure of claim 1 wherein aramid material includes poly(meta-phenylene isophthalamide).

11. The laminate structure of claim 1 in the form of a tape having a width of 0.635 to 5.1 centimeters (0.25 to 2 inches).

12. The laminate structure of claim 1 further comprising an impregnating resin, varnish, or mixture thereof.

13. The laminate structure of claim 12 wherein the resin, varnish, or mixture thereof is partially or completely cured.

* * * * *